US012558782B2

(12) United States Patent
Shimura

(10) Patent No.: US 12,558,782 B2
(45) Date of Patent: Feb. 24, 2026

(54) FORCE CONTROL PARAMETER SETUP SUPPORT METHOD AND FORCE CONTROL PARAMETER SETUP SUPPORT SYSTEM

(71) Applicant: SEIKO EPSON CORPORATION, Tokyo (JP)

(72) Inventor: Yuma Shimura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 656 days.

(21) Appl. No.: 17/853,982

(22) Filed: Jun. 30, 2022

(65) Prior Publication Data

US 2023/0001577 A1      Jan. 5, 2023

(30) Foreign Application Priority Data

Jul. 1, 2021      (JP) ................................. 2021-110103

(51) Int. Cl.
*B25J 9/16* (2006.01)
*B25J 11/00* (2006.01)

(52) U.S. Cl.
CPC ............. *B25J 9/1633* (2013.01); *B25J 9/161* (2013.01); *B25J 9/1653* (2013.01); *B25J 11/0065* (2013.01)

(58) Field of Classification Search
CPC ........ B25J 9/1633; B25J 9/161; B25J 9/1653; B25J 11/0065; B25J 9/1679; B25J 9/1694; G05B 2219/39338; G05B 2219/40586; G05B 2219/45096; B24B 51/00
USPC ........................................................ 700/104
See application file for complete search history.

(56) References Cited

U.S. PATENT DOCUMENTS

| | | | | |
|---|---|---|---|---|
| 2014/0188281 A1 | 7/2014 | Nagai et al. | | |
| 2018/0021912 A1* | 1/2018 | Shimamura | ............. | B24B 21/00 |
| | | | | 451/41 |
| 2018/0293636 A1* | 10/2018 | Pollak | ................ | G06Q 30/0625 |
| 2019/0206693 A1* | 7/2019 | Fournel | ................ | B24B 37/013 |
| 2019/0232492 A1* | 8/2019 | Takeuchi | ................... | B25J 9/16 |
| 2020/0398423 A1* | 12/2020 | Hane | ...................... | B25J 13/085 |

FOREIGN PATENT DOCUMENTS

| | | |
|---|---|---|
| JP | H05-150826 A | 6/1993 |
| JP | H06-019522 A | 1/1994 |
| JP | 2005-081477 A | 3/2005 |
| JP | 2014-233814 A | 12/2014 |
| JP | 2021-000672 A | 1/2021 |

* cited by examiner

*Primary Examiner* — Thomas C Lee
*Assistant Examiner* — Michael Tang
(74) *Attorney, Agent, or Firm* — Harness, Dickey & Pierce, P.L.C.

(57) ABSTRACT

A force control parameter setup support method of supporting a setup of a force control parameter to be used for force control when controlling a robot arm a tip of which is attached with a polishing tool using the force control to perform a polishing task on an object including a first step of obtaining task information related to the polishing task, a second step of selectively reading out information of the force control parameter corresponding to the task information obtained in the first step from a storage section in which a plurality of pieces of information of the force control parameter is stored, and a third step of displaying the information of the force control parameter read out in the second step on a display section.

6 Claims, 14 Drawing Sheets

FIG. 5

D2

Select Material                                                                    ✕

STEP1 STEP2

Step 2 : Select the workpiece material.
Select the workpiece material to be polished from the list.
When the material of the workpiece does not exist in the list
   1. Click on the "N/A" button
   2. Enter the name of the original material in the "Original Material" column
   3. Select the material with characteristics similar to the "Original Material" from the list Material List                Characteristic ABS                          POM(Poly Oxy Methylene)
Acrylic                        "POM" is a resin with high crystallinity and excellent fatigue resistance.
PVC
Bakelite                     Product :Gears, Bearings, Pulleys, Door handles, Pipe fitting parts, Fasteners, etc.
SS400
S45C
SPCC
SUS
Titanium

| WORK MATERIAL SAMPLE IMAGE 1 | WORK MATERIAL SAMPLE IMAGE 2 | WORK MATERIAL SAMPLE IMAGE 3 | WORK MATERIAL SAMPLE IMAGE 4 |

☐ N/A(Not Applicable)

Original Material                                    Material      POM

Cancel   < Back   Next >

Select Abrasive Backing                                                                        ✕

| STEP1 | STEP2 | STEP3 |

Step 3 : Select the abrasive backing of the grinder.

Select the abrasive backing material of the grinder from the list.

When the material of the abrasive backing does not exist in the list.

1. Click on the "N/A" button.

2. Enter the original abrasive backing material of the grinder in the "Original Backing" column.

3. Select the abrasive backing of the grinder with characteristics similar to the "Original Backing" from the list.

Backing List                Characteristic

Paper
Cloth          Form/Sponge
Film
Net              "Buff" is a disc-shaped tool made of cotton, felt, sisal and other fiber materials.
Form
                   "Buff" is used for various finishing processes such as mirror polishing and hairline processing.

"Buff" can be used to make the surface of the object to be polished smooth.

| BACKING MATERIAL SAMPLE IMAGE 1 | BACKING MATERIAL SAMPLE IMAGE 2 | BACKING MATERIAL SAMPLE IMAGE 3 | BACKING MATERIAL SAMPLE IMAGE 4 |

☐ N/A(Not Applicable)

Original Backing                                        Backing        Buff

Cancel      < Back      Next >

Select Abrasive Grain                                                                                         ×

| STEP1 | STEP2 | STEP3 | STEP4 |

Step 4 : Select the abrasive grain.
Select the abrasive grain material of the grinder from the list.
When the abrasive grain of the grinder does not exist in the list.
  1. Click on the "N/A" button.
  2. Enter the original abrasive grain material of the grinder in the "Original Abrasive" column.
  3. Select the abrasive grain material of the grinder with characteristics similar to the "Original Abrasive" from the list.

Abrasive List          Characteristic

| A |
| WA |
| PA |
| HA |
| AE |
| AZ(25) |
| AZ(40) |
| C |
| GC |
| D |
| SD |
| SDC |
| CBN |
| CBNC |

CBN(Cubic Boron Nitride)
"CBN" is the abrasive grain that is thermally resistant to 1,300° C compared to diamond.

In addition "CBN" has the second highest hardness after diamond making it suitable for machining hard materials, including ferrous materials.
"CBN" has a moderate degree of cleavage, which causes micro-fragmentation at the tip of the grain and keeps the cutting edge sharp.
Polished materials: High-hardness materials, including ferrous materials (hardened steel, tool steel, cemented carbide, cast iron, etc.)

ABRASIVE GRAIN
MATERIAL
SAMPLE IMAGE 1

☐ N/A(Not Applicable)

Original Abrasive Grain :                              Abrasive Grain        CBN Cancel     < Back     Next >

FIG. 8
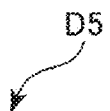
D5
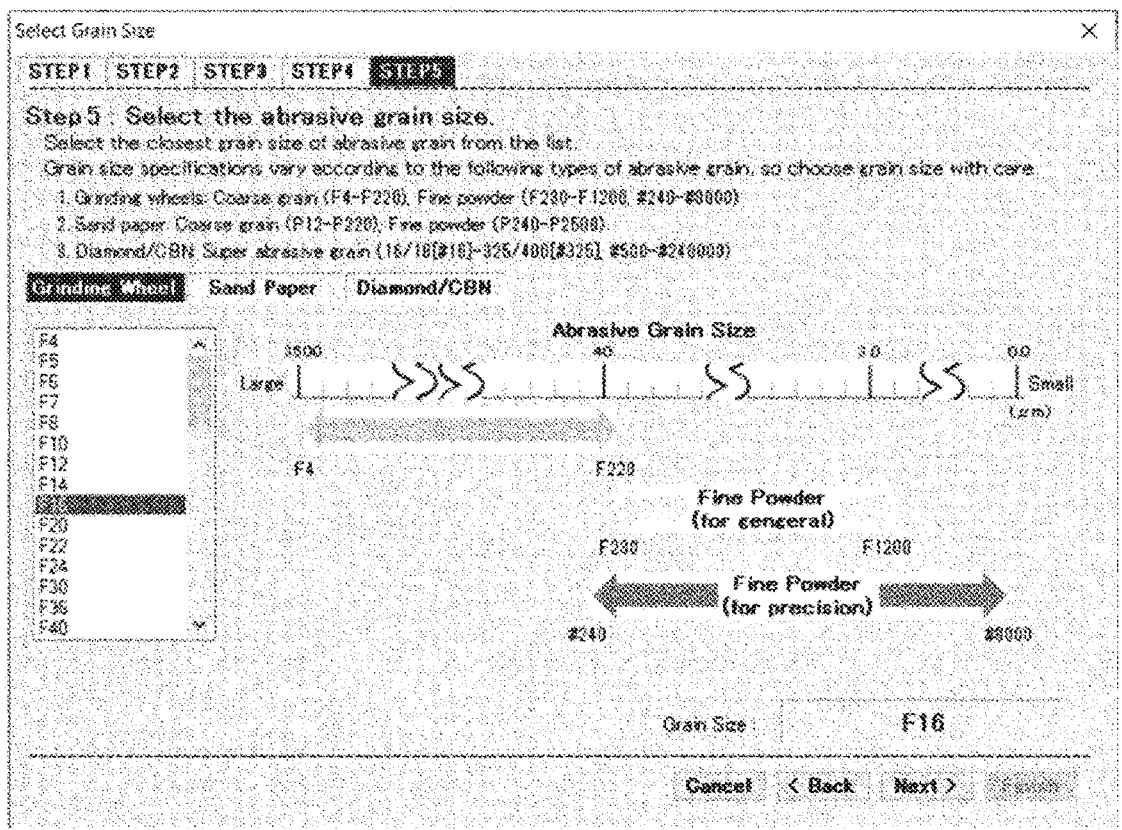

FIG. 10
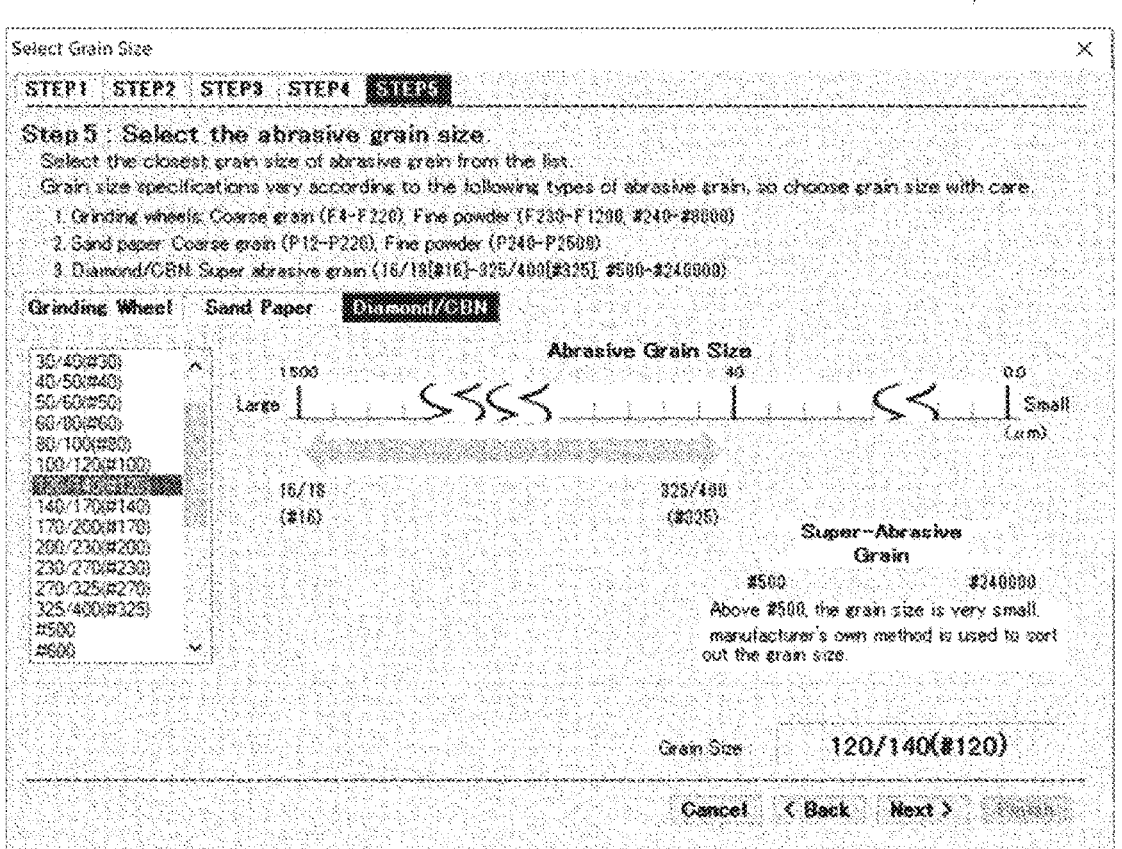

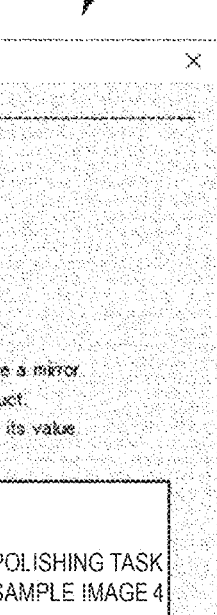

Select Task     ✕

STEP1   STEP2   STEP3   STEP4   STEP5   STEP6   STEP7

Step 7 : Select the polishing task.
Select the polishing task from the list that affects the pressing force and other polishing
When the polishing task does not exist in the list.
   1. Click on the "N/A" button.
   2. Enter the original polishing task in the "Original Task" column.
   3. Select the polishing task with characteristics similar to the "Original Task" from the list.

Task List

Deburring
Cutter Mark Removal
Parting line Removal
Hairline Finish

Characteristic

Mirror Finish
"Mirror Finish" is a polishing method to make the metal surface look like a mirror.
"Mirror Finish" removes fine burrs and increases the safety of the product.
"Mirror Finish" improves the appearance of the product, thus increasing its value.

POLISHING TASK SAMPLE IMAGE 1   POLISHING TASK SAMPLE IMAGE 2   POLISHING TASK SAMPLE IMAGE 3   POLISHING TASK SAMPLE IMAGE 4

☐ N/A(Not Applicable)

Original Task            Task   Mirror Finish

Cancel   < Back   Next >

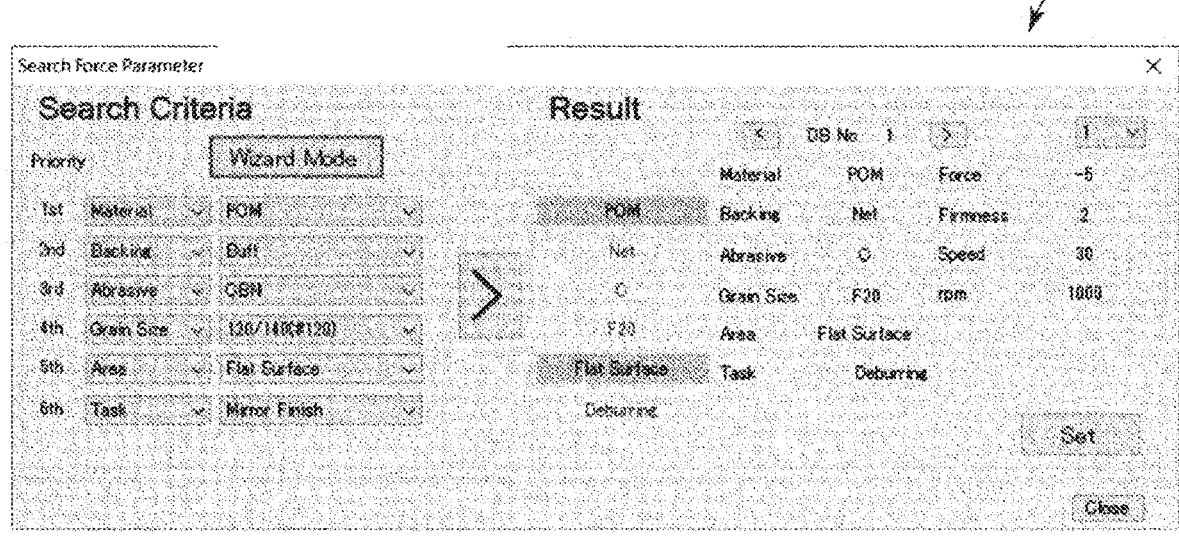

Check the Category ✕

| STEP1 | STEP2 | STEP3 | STEP4 | STEP5 | STEP6 | STEP7 | STEP8 |

Step 8 : Check the search criteria and Search for parameters.
Make sure the search criteria are correct.
If the search criteria are not correct, please click "Back" to reset.
Click on "Finish" to search for the force parameters.

Search Criteria

| Priority | Category | | Detail |
|---|---|---|---|
| 1st | Material | ----- | POM |
| 2nd | Backing | ----- | Buff |
| 3rd | Abrasive | ----- | CBN |
| 4th | Grain Size | ----- | 120/140(#120) |
| 5th | Area | ----- | Flat Surface |
| 6th | Task | ----- | Mirror Finish |

Cancel  < Back  Next  Finish

Search Force Parameter ✕

Search Criteria  Result

| Priority | | | | DB No 1 | | |
|---|---|---|---|---|---|---|
| | Wizard Mode | | | Material | POM | Force | -6 |
| 1st | Material | POM | POM | Backing | Net | Firmness | 2 |
| 2nd | Backing | Buff | Net | Abrasive | C | Speed | 30 |
| 3rd | Abrasive | CBN | C | Grain Size | F20 | rpm | 1000 |
| 4th | Grain Size | 120/140(#120) | F20 | Area | Flat Surface | | |
| 5th | Area | Flat Surface | Flat Surface | Task | Deburring | | |
| 6th | Task | Mirror Finish | Deburring | | | | |

Set

Close

START

FIRST STEP — S101

SECOND STEP — S102

THIRD STEP — S103

END

100A

COMPUTER 62
PROCESSOR
MEMORY
I/F

CONTROLLER 61
PROCESSOR
MEMORY
I/F

ROBOT 1

100B

63

COMPUTER

PROCESSOR

MEMORY

I/F

1

ROBOT

100C

65

NETWORK

64

CLOUD

PROCESSOR

MEMORY

66

COMPUTER

PROCESSOR

MEMORY

I/F

1

ROBOT

61

CONTROLLER

PROCESSOR

MEMORY

I/F

FORCE CONTROL PARAMETER SETUP SUPPORT METHOD AND FORCE CONTROL PARAMETER SETUP SUPPORT SYSTEM

The present application is based on, and claims priority from JP Application Serial Number 2021-110103, filed Jul. 1, 2021, the disclosure of which is hereby incorporated by reference herein in its entirety.

BACKGROUND

1. Technical Field

The present disclosure relates to a force control parameter setup support method and a force control parameter setup support system.

2. Related Art

For example, in JP-A-2005-81477, there is disclosed an automatic polishing device for performing polishing by moving a polishing tool along a path programmed in advance. In the present automatic polishing device, there is performed an action of moving a tool based on a polishing force measurement device for measuring a polishing force applied to the polishing tool to thereby keep the polishing force constant, namely an action using force control. Therefore, it is possible to perform a polishing task while keeping the polishing force in a value as close to a predetermined value as possible.

When performing the force control, it is necessary to set force control parameters to an appropriate value. However, in this setup, there is adopted a method of repeating the task while changing the force control parameters to search for the force control parameters suitable for the polishing task, and therefore, the adjustment is difficult for anyone except persons of experience.

SUMMARY

A force control parameter setup support method according to the present disclosure is a force control parameter setup support method of supporting a setup of a force control parameter to be used for force control when controlling a robot arm a tip of which is attached with a polishing tool using the force control to perform a polishing task on an object including a first step of obtaining task information related to the polishing task, a second step of selectively reading out information of the force control parameter corresponding to the task information obtained in the first step from a storage section in which a plurality of pieces of information of the force control parameter is stored, and a third step of displaying the information of the force control parameter read out in the second step on a display section.

A force control parameter setup support system according to the present disclosure includes a setup support section configured to support a setup of a force control parameter to be used for force control when controlling a robot arm a tip of which is attached with a polishing tool using the force control to perform a polishing task on an object, wherein the setup support section includes an acquisition section configured to obtain task information related to the polishing task, a readout section configured to selectively read out information of the force control parameter corresponding to the task information obtained by the acquisition section from a storage section in which a plurality of pieces of information of the force control parameter is stored, and a display control section configured to display the information of the force control parameter read out by the readout section on a display section.

BRIEF DESCRIPTION OF THE DRAWINGS

FIG. 5 is a diagram showing an example of the screen displayed on the display section.

FIG. 6 is a diagram showing an example of the screen displayed on the display section.

FIG. 7 is a diagram showing an example of the screen displayed on the display section.

FIG. 8 is a diagram showing an example of the screen displayed on the display section.

FIG. 10 is a diagram showing an example of the screen displayed on the display section.

FIG. 12 is a diagram showing an example of the screen displayed on the display section.

FIG. 13 is a diagram showing an example of the screen displayed on the display section.

FIG. 14 is a diagram showing an example of the screen displayed on the display section.

DESCRIPTION OF AN EXEMPLARY EMBODIMENT

Embodiment

Figure 1:
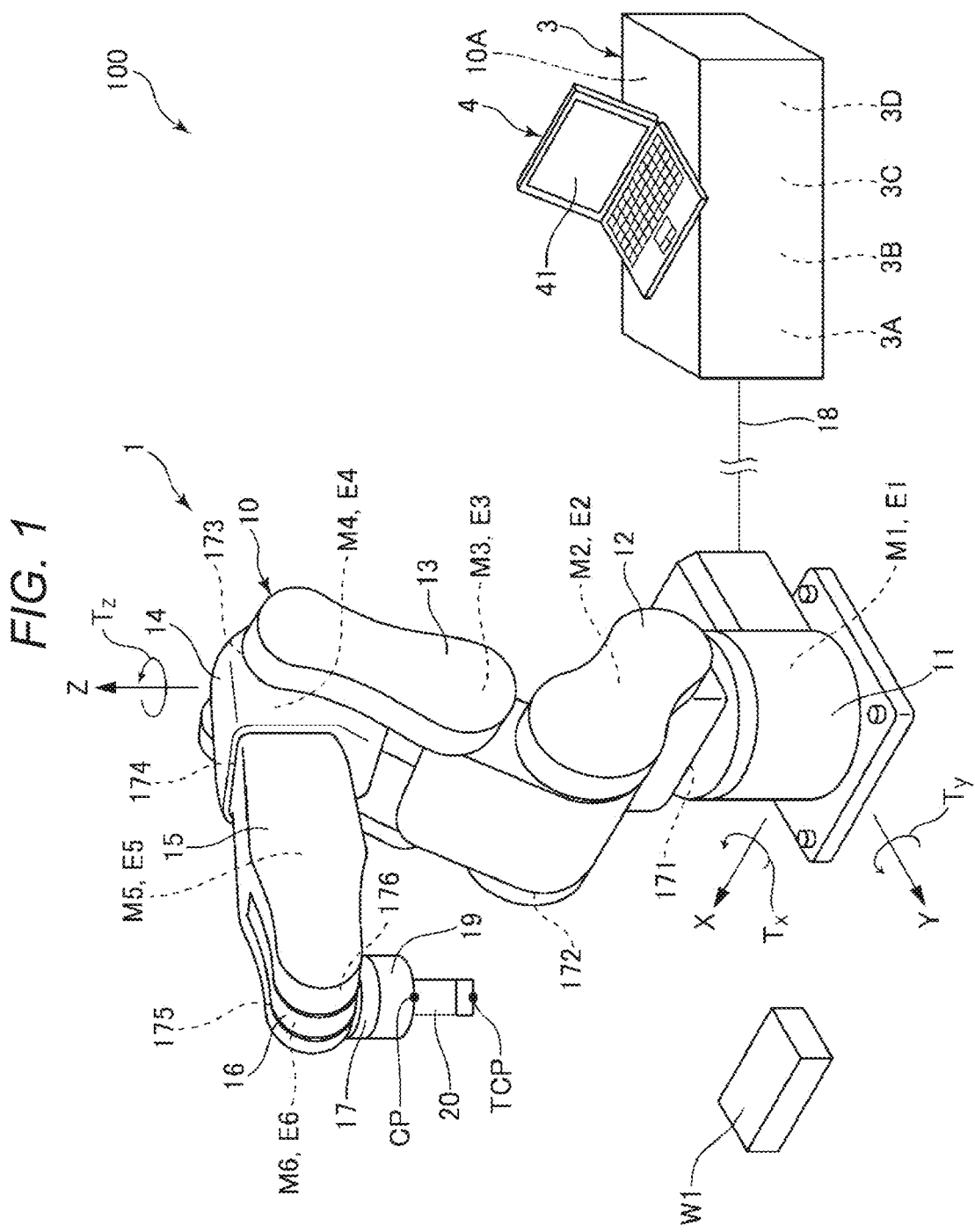
FIG. 1 is a diagram showing an overall configuration of a robotic system for executing a force control parameter setup support method according to the present disclosure.
Figure 2:
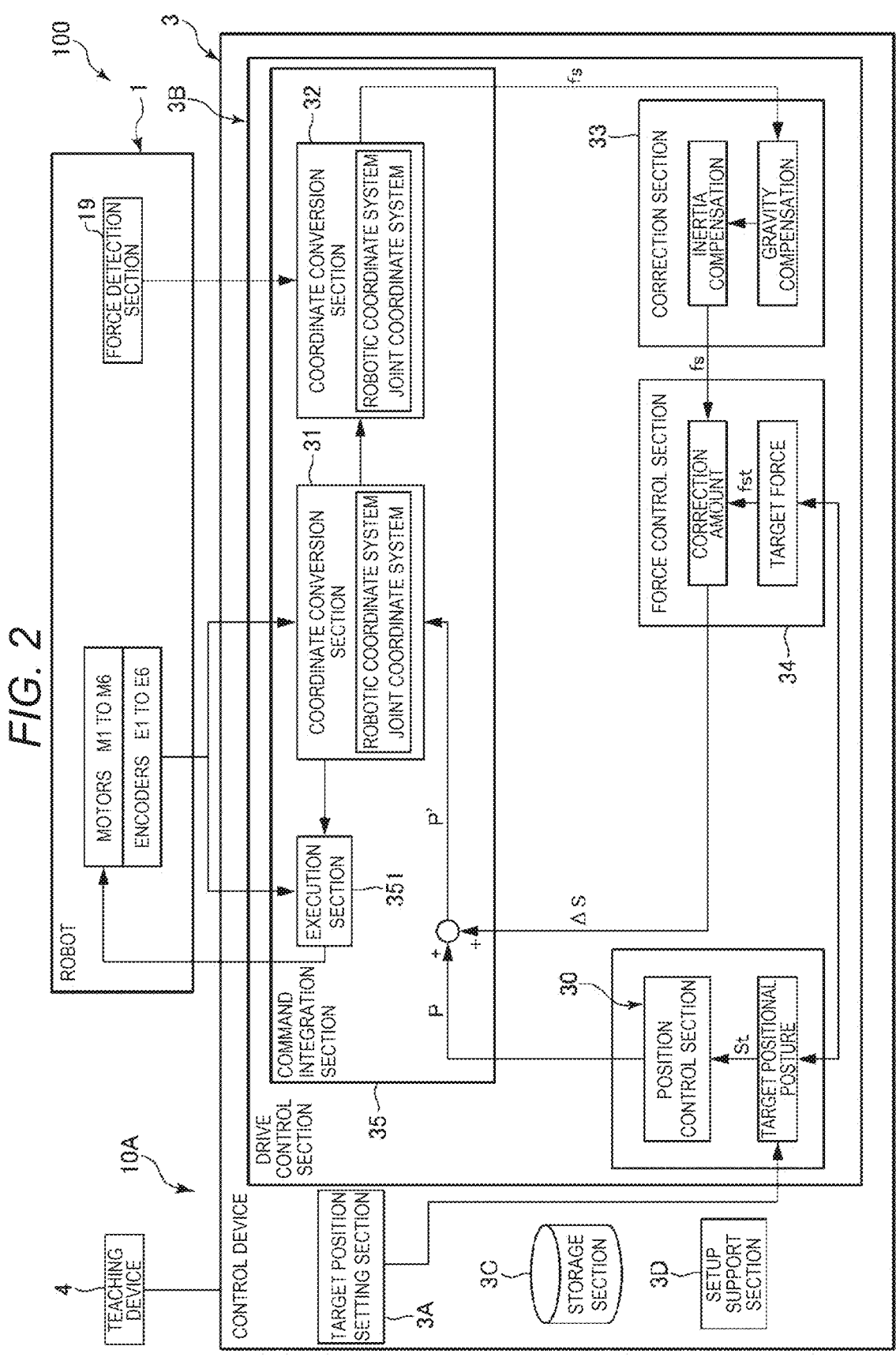
FIG. 2 is a block diagram of the robotic system shown in FIG. 1.
Figure 3:
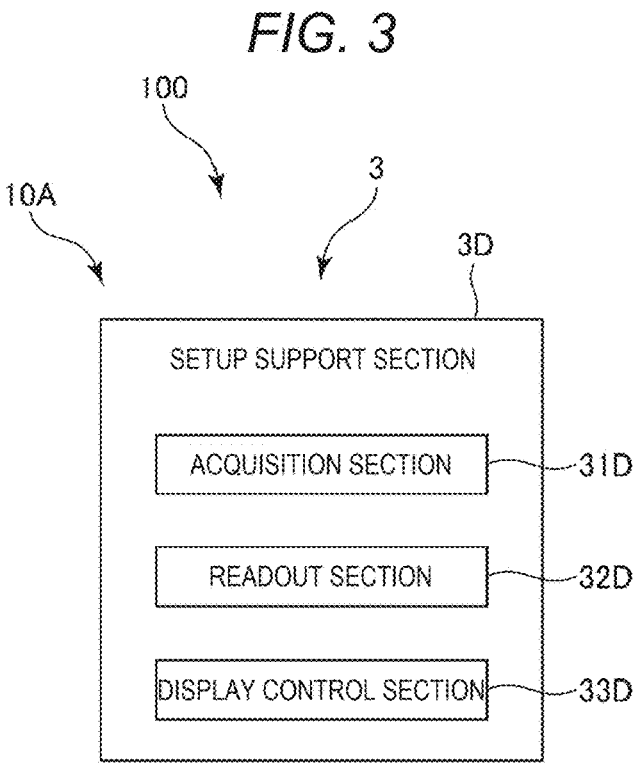
FIG. 3 is a block diagram of a setup support section provided to the robotic system shown in FIG. 2.
Figure 15:
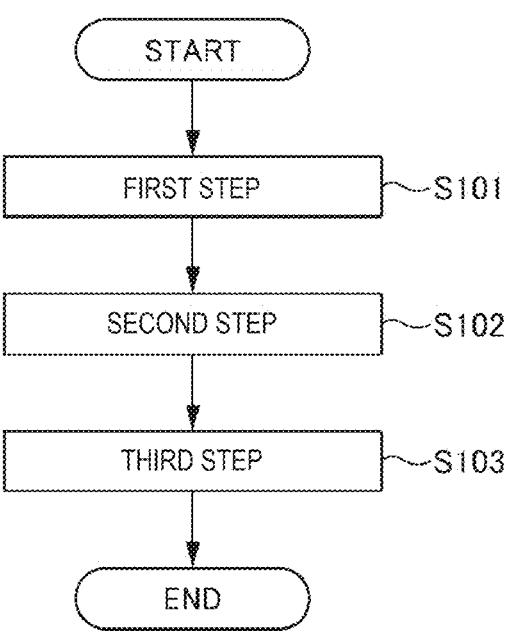
FIG. 15 is a flowchart for explaining a control operation to be executed by the robotic system shown in FIG. 1.

FIG. 1 is a diagram showing an overall configuration of a robotic system for executing a force control parameter setup support method according to the present disclosure. FIG. 2 is a block diagram of the robotic system shown in FIG. 1. FIG. 3 is a block diagram of a setup support section provided to the robotic system shown in FIG. 2. FIG. 4 through FIG. 14 are each a diagram showing an example of a screen displayed on a display section. FIG. 15 is a flowchart for explaining a control operation to be executed by the robotic system shown in FIG. 1.

The force control parameter setup support method and the force control parameter setup support system according to the present disclosure will hereinafter be described in detail based on a preferred embodiment shown in the accompanying drawings. It should be noted that hereinafter a +Z-axis direction, namely an upper side in FIG. 1, is referred to as an "upper side," and a −Z-axis direction, namely a lower side thereof, is referred to as a "lower side" for the sake of convenience of explanation. Further, regarding the robot arm, a platform side in FIG. 1 is referred to as a "base end," and an opposite side, namely an end effector side, is referred to as a "tip." Further, the Z-axis direction, namely an up-down direction in FIG. 1, is defined as a "vertical direction," and the X-axis direction and the Y-axis direction, namely a right-left direction and a front-back direction, are defined as a "horizontal direction."

As shown in FIG. 1, the robotic system 100 is provided with a robot 1, a control device 3 for controlling the robot 1, and a teaching device 4, and executes the force control parameter setup support method according to the present disclosure. Further, the control device 3 incorporates the force control parameter setup support system 10A, and the force control parameter setup support method according to the present disclosure is executed by the force control parameter setup support system 10A.

First, the robot 1 will be described.

The robot 1 shown in FIG. 1 is a single-arm six-axis vertical articulated robot in the present embodiment, and has a platform 11 and a robot arm 10. Further, it is possible to mount an end effector 20 on a tip portion of the robot arm 10. The end effector 20 can be a constituent element of the robot 1, or is not required to be a constituent element of the robot 1.

It should be noted that the robot 1 is not limited to the illustrated configuration, and can be, for example, a double-arm articulated robot. Further, the robot 1 can be a horizontal articulated robot.

The platform 11 is a support body for supporting the robot arm 10 from a lower side so as to be able to drive the robot arm 10, and is fixed to, for example, a floor in a factory. In the robot 1, the platform 11 is electrically coupled to the control device 3 via a relay cable 18. It should be noted that the coupling between the robot 1 and the control device 3 is not limited to the coupling with wire as the configuration shown in FIG. 1, but can be, for example, coupling without wire.

In the present embodiment, the robot arm 10 has a first arm 12, a second arm 13, a third arm 14, a fourth arm 15, a fifth arm 16, and a sixth arm 17, wherein these arms are coupled to one another in this order from the platform 11 side. It should be noted that the number of the arms provided to the robot arm 10 is not limited to six, and can be, for example, one, two, three, four, five, or seven or more. Further, a size such as a total length of each of the arms is not particularly limited, and can arbitrarily be set.

The platform 11 and the first arm 12 are coupled to each other via a joint 171. Further, the first arm 12 is arranged to be able to rotate around a first rotational axis parallel to the vertical direction with respect to the platform 11 taking the first rotational axis as a rotational center. The first rotational axis coincides with a normal line of the floor to which platform 11 is fixed.

The first arm 12 and the second arm 13 are coupled to each other via a joint 172. Further, the second arm 13 is arranged to be able to rotate with respect to the first arm 12 taking a second rotational axis parallel to the horizontal direction as a rotational center. The second rotational axis is parallel to an axis perpendicular to the first rotational axis.

The second arm 13 and the third arm 14 are coupled to each other via a joint 173. Further, the third arm 14 is arranged to be able to rotate with respect to the second arm 13 taking a third rotational axis parallel to the horizontal direction as a rotational center. The third rotational axis is parallel to the second rotational axis.

The third arm 14 and the fourth arm 15 are coupled to each other via a joint 174. Further, the fourth arm 15 is arranged to be able to rotate with respect to the third arm 14 taking a fourth rotational axis parallel to a central axis of the third arm 14 as a rotational center. The fourth rotational axis is perpendicular to the third rotational axis.

The fourth arm 15 and the fifth arm 16 are coupled to each other via a joint 175. Further, the fifth arm 16 is arranged to be able to rotate with respect to the fourth arm 15 taking a fifth rotational axis as a rotational center. The fifth rotational axis is perpendicular to the fourth rotational axis.

The fifth arm 16 and the sixth arm 17 are coupled to each other via a joint 176. Further, the sixth arm 17 is arranged to be able to rotate with respect to the fifth arm 16 taking a sixth rotational axis as a rotational center. The sixth rotational axis is perpendicular to the fifth rotational axis.

Further, the sixth arm 17 forms a robot tip portion located at the farthest to the tip side in the robot arm 10. The sixth arm 17 can rotate together with the end effector 20 due to the drive of the robot arm 10.

The robot 1 is provided with a motor M1, a motor M2, a motor M3, a motor M4, a motor M5, and a motor M6 as a drive section, an encoder E1, an encoder E2, an encoder E3, an encoder E4, an encoder E5, and an encoder E6. The motor M1 is incorporated in the joint 171, and rotates the platform 11 and the first arm 12 relatively to each other. The motor M2 is incorporated in the joint 172, and rotates the first arm 12 and the second arm 13 relatively to each other. The motor M3 is incorporated in the joint 173, and rotates the second arm 13 and the third arm 14 relatively to each other. The motor M4 is incorporated in the joint 174, and rotates the third arm 14 and the fourth arm 15 relatively to each other. The motor M5 is incorporated in the joint 175, and rotates the fourth arm 15 and the fifth arm 16 relatively to each other. The motor M6 is incorporated in the joint 176, and rotates the fifth arm 16 and the sixth arm 17 relatively to each other.

Further, the encoder E1 is incorporated in the joint 171, and detects a position of the motor M1. The encoder E2 is incorporated in the joint 172, and detects a position of the motor M2. The encoder E3 is incorporated in the joint 173, and detects a position of the motor M3. The encoder E4 is incorporated in the joint 174, and detects a position of the motor M4. The encoder E5 is incorporated in the joint 175, and detects a position of the motor M5. The encoder E6 is incorporated in the joint 176, and detects a position of the motor M6.

The encoders E1 through the encoder E6 are electrically coupled to the control device 3, and positional information, namely an amount of rotation, of each of the motor M1 through the motor M6 is transmitted to the control device 3 as an electric signal. Further, based on this information, the control device 3 drives the motor M1 through the motor M6 via a driver not shown. In other words, controlling the robot arm 10 is controlling the motor M1 through the motor M6.

Further, at the tip of the robot arm 10, there is set a control point CP. The control point CP means a point acting as a reference when performing the control of the robot arm 10. In the robotic system 100, a position of the control point CP is figured out in a robotic coordinate system, and the robot arm 10 is driven so that the control point CP moves to a desired position.

Further, in the robot 1, the robot arm 10 is provided with a force detection section 19 for detecting the force in a detachable manner. Further, the robot arm 10 can be driven in a state in which the force detection section 19 is provided. The force detection section 19 is a six-axis kinesthetic sensor in the present embodiment. The force detection section detects magnitudes of forces on three detection axes perpendicular to each other, and magnitudes of torques around the respective three detection axes. Specifically, the force detection section 19 detects force components in the respective axial directions of an X axis, a Y axis, and a Z axis perpendicular to each other, a force component in a Tx direction around the X axis, a force component in a Ty direction around the Y axis, and a force component in a Tz direction around the Z axis. It should be noted that in the present embodiment, the Z-axis direction corresponds to a vertical direction. Further, the force component in each of the axial directions can be referred to as a "translational force component," and the force component around each of the axes can be referred to as a "rotational force component." Further, the force detection section 19 is not limited to the six-axis kinesthetic sensor, and can be one having another configuration.

In the present embodiment, the force detection section 19 is provided to the sixth arm 17. It should be noted that the installation place of the force detection section 19 is not limited to the sixth arm 17, namely the arm located at the farthest to the tip side, and can be, for example, another arm, an area between the arms adjacent to each other, or a place below the platform 11, or it is possible to provide the force detection section 19 to each of the joints.

It is possible to detachably mount the end effector on the force detection section 19. In the present embodiment, the end effector 20 is formed of a polishing tool for performing polishing. The end effector 20 has a grinder at the tip, and polishes a work W1 with the grinder making contact with the work W1 while rotating. It should be noted that although the grinder is used as the polishing tool in the present embodiment, this is not a limitation, and it is possible to adopt a sponge or what is obtained by making abrasive grains adhere to paper, cloth, or a film.

Further, in the robotic coordinate system, a tool center point TCP is set at an arbitrary position at the tip of the end effector 20, preferably at a tip of the grinder. As described above, in the robotic system 100, the position of the control point CP is figured out in the robotic coordinate system, and the robot arm 10 is driven so that the control point CP moves to the desired position. Further, by figuring out a type, in particular a length, of the end effector 20 in advance, it is possible to figure out an amount of an offset between the tool center point TCP and the control point CP. Therefore, it is possible to figure out the position of the tool center point TCP in the robotic coordinate system. Therefore, it is possible to use the tool center point TCP as a reference of the control.

The work W1 is an object of the polishing by the end effector 20. In the surface of the work W1, an area to be polished corresponds to a polishing area. As the work W1, there can be cited a connector of electronic equipment, plastic exterior equipment, metal exterior equipment, and so on.

Then, the control device 3 and the teaching device 4 will be described.

The control device 3 is arranged at a distance from the robot 1, and can be constituted by a computer incorporating a CPU (Central Processing Unit) as an example of a processor, and so on. The control device 3 can be incorporated in the platform 11 of the robot 1.

The control device 3 is coupled to the robot 1 with the relay cable 18 so as to be able to communicate with each other. Further, the control device 3 is coupled to the teaching device 4 so as to be able to communicate with each other wirelessly or with a cable. The teaching device 4 can be a dedicated computer, or can also be a general-purpose computer in which a program for teaching the robot 1 is installed. It is possible to use, for example, a teaching pendant as a dedicated device for teaching the robot 1 instead of the teaching device 4. Further, it is possible for the control device 3 and the teaching device 4 to be provided with respective chassis separated from each other, or to be configured integrally with each other.

Further, a program for generating an execution program which uses a target positional posture $S_t$ and a target force $f_{St}$ described later as parameters, and then loading the execution program to the control device 3 can be installed in the control device 3. The teaching device 4 is provided with a display, a processor, a RAM, and a ROM, and these hardware resources generate the execution program in cooperation with the teaching program.

As shown in FIG. 2, the control device 3 is a computer in which the control program for performing the control of the robot 1 is installed. The control device 3 is provided with a processor, and a RAM and a ROM not shown, and these hardware resources cooperate with a program to thereby control the robot 1.

Further, as shown in FIG. 2, the control device 3 has a target position setting section 3A, a drive control section 3B, a storage section 3C, and a setup support section 3D. The storage section 3C is constituted by, for example, a volatile memory such as a RAM (Random Access Memory), a nonvolatile memory such as a ROM (Read Only Memory), and a removable external storage device. The storage section 3C stores an operation program for operating the robot 1 such as a program for executing the force control parameter setup support method according to the present disclosure.

It should be noted that the setup support section 3D has a configuration of being incorporated in the control device 3 in the present embodiment, but is not limited to this configuration in the present disclosure, and can be incorporated in the teaching device 4.

The target position setting section 3A sets the target positional posture $S_t$ and an operation path for executing a predetermined operation on the work W1. The target position setting section 3A sets the target positional posture $S_t$ and the operation path based on the teaching information input from the teaching device 4.

The drive control section 3B is for controlling the drive of the robot arm 10, and has a position control section 30, a coordinate conversion section 31, a coordinate conversion section 32, a correction section 33, a force control section 34, and a command integration section 35.

The position control section 30 generates a position command signal for controlling a position of the tool center point TCP of the robot 1, namely a position command value, based on the target position designated using a command created in advance.

Here, the control device 3 is capable of controlling the operation of the robot 1 using force control and so on. The "force control" means control of an operation of the robot 1 of changing a position of the end effector 20, namely a position of the tool center point TCP, and postures of the first arm 12 through the sixth arm 17 based on the detection result of the force detection section 19.

The force control includes, for example, force trigger control and impedance control. In the force trigger control, the force detection is performed by the force detection section 19, and the robot arm 10 is made to perform an operation such as a displacement or a change in posture until a predetermined force is detected by the force detection section 19.

The impedance control includes imitation control. First, in a brief description, the operation of the robot arm 10 is controlled in the impedance control so as to keep the force applied to the tip portion of the robot arm 10 to a predetermined force as precisely as possible, namely so as to keep the force in a predetermined direction detected by the force detection section 19 at the target force $f_{St}$ as precisely as possible. Thus, for example, when the impedance control is performed on the robot arm 10, the robot arm 10 performs an operation imitating an external force applied from the object or an operator with respect to the predetermined direction. It should be noted that the target force $f_{St}$ includes 0. For example, as one of the settings when performing the imitation operation, it is possible to set the target value to "0." It should be noted that it is possible to set the target force $f_{St}$ to a numerical value other than 0. It is possible for the operator to arbitrarily set the target force $f_{St}$.

The storage section 3C stores a correspondence relationship between a combination of rotational angles of the motor M1 through the motor M6, and a position of the tool center point TCP in the robotic coordinate system. Further, the control device 3 stores at least one of the target positional posture $S_t$ and the target force $f_{St}$ in the storage section 3C based on a command in every step of an operation performed by the robot 1. The command using the target positional posture $S_t$ and the target force $f_{St}$ as parameters is set for every step of the operation performed by the robot 1.

The drive control section 3B controls the first arm through the sixth arm 17 so that the target positional posture $S_t$ and the target force $f_{St}$ thus set are achieved at the tool center point TCP. The target force $f_{St}$ means a detected force and a torque of the force detection section 19 to be achieved by actions of the first arm 12 through the sixth arm 17. Here, the character "S" is assumed to represent any one of the directions (X, Y, and Z) of the axes defining the robotic coordinate system. Further, it is also assumed that the character S also represents a position in the S direction. For example, in the case of S=X, the X direction component of the target position set in the robotic coordinate system becomes $S_t=X_t$, and the X direction component of the target force becomes $f_{St}=f_{Xt}$.

Further, in the drive control section 3B, when the rotational angles of the motor M1 through the motor M6 are obtained, the coordinate conversion section 31 shown in FIG. 2 converts the rotational angles into the positional posture S (X, Y, Z, U, V, or W) at the tool center point TCP in the robotic coordinate system based on the correspondence relationship. Then, the coordinate conversion section 32 identifies an acting force $f_S$ actually acting on the force detection section 19 in the robotic coordinate system based on the positional posture S of the tool center point TCP and the detection value of the force detection section 19.

An acting point of the acting force $f_S$ is defined as a force detection origin separately from the tool center point TCP. The force detection origin corresponds to a point at which the force detection section 19 is detecting a force. It should be noted that the control device 3 stores a correspondence relationship which defines a direction of a detection axis in a sensor coordinate system of the force detection section 19 for every positional posture S of the tool center point TCP in the robotic coordinate system. Therefore, it is possible for the control device 3 to identify the acting force $f_S$ in the robotic coordinate system based on the correspondence relationship with the positional posture S of the tool center point TCP in the robotic coordinate system. Further, the torque acting on the robot 1 can be calculated from the acting force $f_S$ and a distance from the contact point to the force detection section 19, and is identified as a torque component. It should be noted that when the end effector 20 makes contact with the work W1 to perform an operation, the contact point can be assumed as the tool center point TCP.

The correction section 33 performs a gravity compensation on the acting force $f_S$. The gravity compensation means elimination of a component of a force or a torque caused by the gravity from the acting force $f_S$. The acting force $f_S$ on which the gravity compensation has been performed can be assumed as a force other than the gravity acting on the robot arm 10 or the end effector 20.

Further, the correction section 33 performs an inertia compensation on the acting force $f_S$. The inertia compensation means elimination of a component of a force or a torque caused by an inertial force from the acting force $f_S$. The acting force $f_S$ on which the inertia compensation has been performed can be assumed as a force other than the inertial force acting on the robot arm 10 or the end effector 20.

The force control section 34 performs the impedance control. The impedance control is active impedance control which realizes an imaginary mechanical impedance with the motor M1 through the motor M6. The control device 3 performs such impedance control when performing direct teaching and a step in a contact state in which the end effector 20 receives a force from the work W1 as an object such as a fitting task of the work W1, a screwing task, or a polishing task. It should be noted that besides such a step, by performing the impedance control when, for example, a human makes contact with the robot 1, it is possible to enhance the safety.

In the impedance control, the target force $f_{St}$ is substituted into a motion equation described later to derive the rotational angles of the motor M1 through the motor M6. Signals with which the control device 3 controls the motor M1 through the motor M6 are each a signal modulated with PWM (Pulse Width Modulation).

Further, in a step in a non-contact state in which the end effector 20 does not receive an external force, the control device 3 controls the motor M1 through the motor M6 with the rotational angles derived by a linear operation from the target positional posture $S_t$. A mode in which the motor M1 through the motor M6 are controlled with the rotational angles derived by the linear operation from the target positional posture $S_t$ is referred to as a position control mode.

The control device 3 substitutes the target force $f_{St}$ and the acting force $f_S$ into the motion equation of the impedance control to thereby identify a force-derived correction value ΔS. The force-derived correction value ΔS means a magnitude of the positional posture S which the tool center point TCP should move for dissolving a force deviation $\Delta f_S(t)$ from the target force $f_{St}$ when the tool center point TCP has received the mechanical impedance. The following formula (1) is the motion equation of the impedance control.

$$m\Delta\ddot{S}(t)+d\Delta\dot{S}(t)+k\Delta S(t)=\Delta f_S(t) \tag{1}$$

The left-hand side of the formula (1) is constituted by a first term in which a second order differential value of the positional posture S of the tool center point TCP is multiplied by a virtual mass coefficient m (hereinafter referred to as a "mass coefficient m"), a second term in which a differential value of the positional posture S of the tool center point TCP is multiplied by a virtual viscosity coefficient d (hereinafter referred to as a "viscosity coefficient d"), and a third term in which the positional posture S of the tool center point TCP is multiplied by a virtual elastic coefficient k (hereinafter referred to as an "elastic coefficient k"). The right-hand side of the formula (1) is formed of the force deviation $\Delta f_S(t)$ obtained by subtracting the actual force f from the target force $f_{St}$. The differential in formula (1) means the temporal differentiation. In the step performed by the robot 1, a constant value is set as the target force $f_{St}$ in some cases, and a function of time is set as the target force $f_{St}$ in some cases.

The mass coefficient m means a mass which the tool center point TCP virtually has, the viscosity coefficient d means a viscosity resistance which the tool center point TCP virtually receives, and the elastic coefficient k means a spring constant of the elastic force which the tool center point TCP virtually receives.

As the value of the mass coefficient m increases, the acceleration of the action decreases, and as the value of the mass coefficient m decreases, the acceleration of the action increases. As the value of the viscosity coefficient d increases, the speed of the action decreases, and as the value of the viscosity coefficient d decreases, the speed of the action increases. As the value of the elastic coefficient k increases, the elasticity increases, and as the value of the elastic coefficient k decreases, the elasticity decreases.

The mass coefficient m, the viscosity coefficient d, and the elastic coefficient k can each be set to values different by direction, or can each also be set to a common value irrespective of the direction. Further, it is possible for the operator to arbitrarily set the mass coefficient m, the viscosity coefficient d, and the elastic coefficient k prior to the operation.

The mass coefficient m, the viscosity coefficient d, and the elastic coefficient k described above are each a force control parameter. The force control parameter is a value set in advance of the robot arm 10 actually performing an operation. The force control parameters include such a target force as described above besides the mass coefficient m, the viscosity coefficient d, and the elastic coefficient k.

As described above, in the robot system 100, during the execution of the force control, the correction value is obtained from the detection value of the force detection section 19, the force control parameters set in advance, and the target force set in advance. This correction value means the force-derived correction value AS described above, and means a difference between the position at which the external force is received, and a position to which the tool center point TCP should be moved.

Further, the command integration section 35 combines the force-derived correction value AS with a position command value P generated by the position control section 30. By performing the above as needed, the command integration section 35 obtains a new position command value P' from the position command value P which has been used for the displacement to the position at which the external force is received.

Then, by the coordinate conversion section 31 converting the new position command value P' into the robotic coordinate and then an execution section 351 executing the operation, it is possible to move the tool center point TCP to the position reflecting the force-derived correction value AS to thereby respond to the external force, and thus relax the further load applied to the object which has made contact with the robot 1.

According to such a drive control section 3B, it is possible to perform the polishing task in good condition while applying desired pressure by performing the force control while pressing the end effector 20 against the work W1.

As shown in FIG. 3, the setup support section 3D has an acquisition section 31D, a readout section 32D, and a display control section 33D.

The acquisition section 31D obtains task information related to the polishing task input by the operator via, for example, the teaching device 4. Here, the task information includes information related to the work W1 as the object, and information related to the polishing tool.

The information related to the work W1 includes information related to a shape of a polishing area of the work W1, a dimension of the polishing area of the work W1, a material of the polishing area, a surface roughness of the polishing area on which the polishing has not been performed, and a target surface roughness of the polishing area on which the polishing has been performed.

It should be noted that it is sufficient for the information related to the work W1 to include the information related to at least one of the items enumerated above.

The information related to the polishing tool includes a type of the polishing tool and an operating condition of the polishing tool.

Specifically, the information related to the polishing tool includes information related to a material of the abrasive grain of the grinder, information related to a size of the abrasive grain, and information related to rotational speed of the grinder.

It should be noted that it is sufficient for the information related to the polishing tool to include the information related to at least one of the items enumerated above.

Such task information is input by the operator using such input screens as shown in FIG. 4 through FIG. 14. This point will be described later in detail.

The readout section 32D selectively reads out the information of the force control parameters corresponding to the task information obtained by the acquisition section 31D, from the storage section 3C which stores a plurality of pieces of information of the force control parameters. In other words, the readout section 32D selectively reads out the information of the force control parameters suitable for the task information thus obtained, from a database stored in the storage section 3C. The method of selecting the information of the force control parameters suitable for the task information will be described later in detail.

The display control section 33D generates a command signal for displaying the information of the force control parameters read out by the readout section 32D on the display section 41.

Then, an example of an input screen when inputting the task information will be described. The input screen is a screen displayed on the display section 41 of the teaching device 4. It should be noted that this configuration is not a limitation, and it is possible to display the input screen on another display section.

Figure 4:
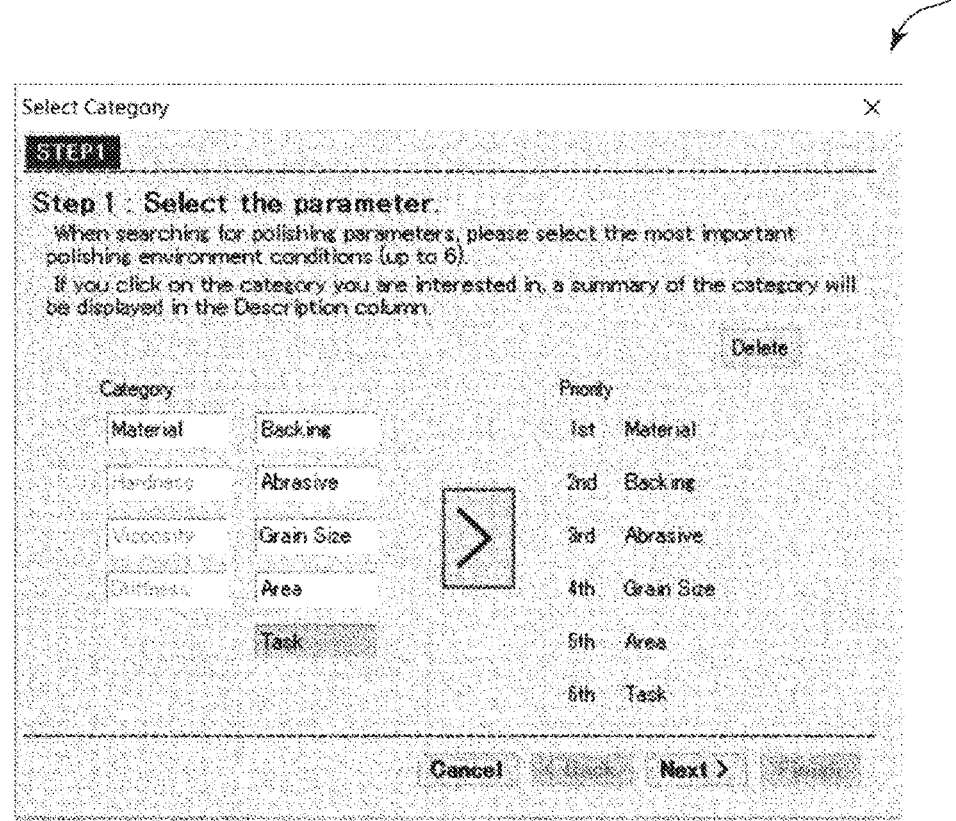
FIG. 4 is a diagram showing an example of a screen displayed on a display section.
Figure 9:
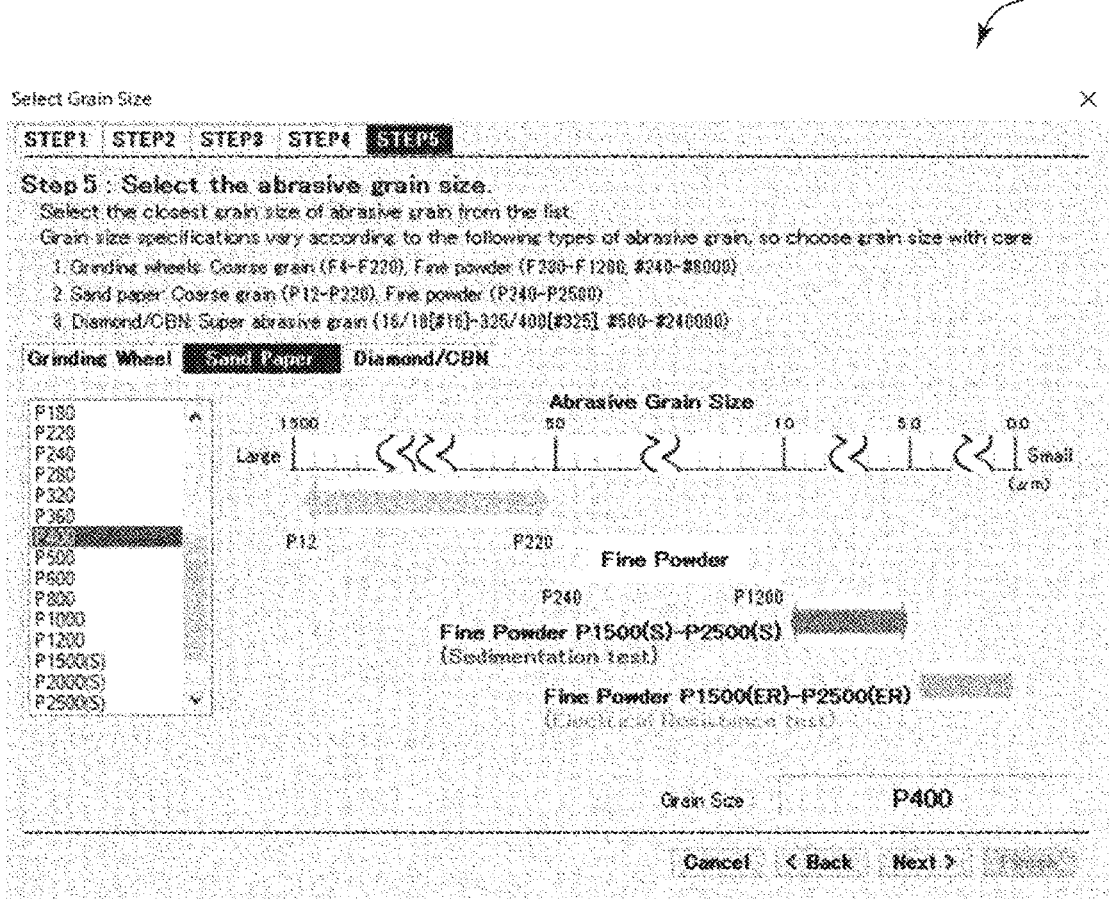
FIG. 9 is a diagram showing an example of the screen displayed on the display section.
Figure 11:
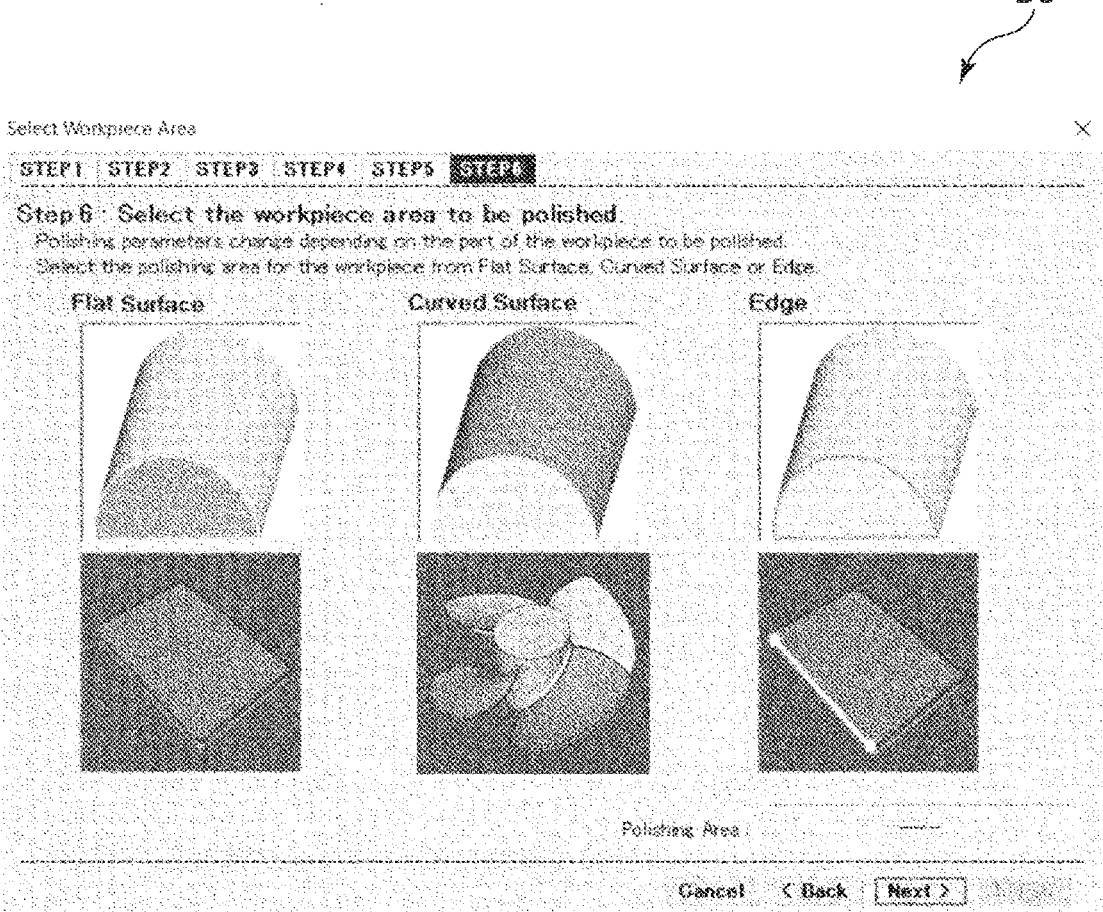
FIG. 11 is a diagram showing an example of the screen displayed on the display section.

As the input screen, there can be cited an input screen D1 shown in FIG. 4, an input screen D2 shown in FIG. 5, an input screen D3 shown in FIG. 6, an input screen D4 shown in FIG. 7, and input screen D5 shown in FIG. 8, an input screen D6 shown in FIG. 9, an input screen D7 shown in FIG. 10, an input screen D8 shown in FIG. 11, and an input screen D9 shown in FIG. 12. In the present embodiment, the input screen D2 through the input screen D9 are arbitrarily displayed in accordance with the contents set in the input screen D1.

In the input screen D1 shown in FIG. 4, by inputting a category in an input section at the left side in the drawing, it is possible to set priorities of the categories into which the task information is classified. In the illustrated configuration, there are displayed six categories of "Material," "Backing," "Abrasive," "Grain Size," "Area," and "Task," and by sequentially inputting these categories, the priorities are set as shown in the display section at the right side in the drawing. The category set to have higher priority is searched for in priority when reading out the force control parameters described later.

"Material" means a material of the work W1, namely a material of the polishing area of the work W1. "Backing" means a backing material of the polishing tool, namely an abrasive backing material. "Abrasive" means an abrasive compound used for the polishing task. "Grain Size" means a size of the abrasive grain of the grinder. "Area" means a shape of the polishing area of the work W1. "Task" means a degree of a finish after the polishing. Due to such an input screen D1, it is possible to set the priorities to the categories.

The input screen D2 shown in FIG. 5 is a screen for inputting the material of the work W1. Specifically, by selecting the material of the work W1 from the area displayed as "Material List," it is possible to select the material of the work W1. In the illustrated configuration, there is selected one from "POM," "ABS," "Acrylic," "PVC," "Bakelite," "SS400," "S45C," "SPCC," "SUS," and "Titanium." Due to such an input screen D2, it is possible to input the information related to the material of the work W1.

The input screen D3 shown in FIG. 6 is a screen for inputting a type of the abrasive backing material of the polishing tool. Specifically, by selecting the backing material from the area displayed as "Backing List," it is possible to select the type of the abrasive backing material. In the illustrated configuration, there is selected one from "Paper," "Cloth," "Film," "Net," "Form," and "Buff." Due to such an input screen D3, it is possible to input the information related to the type of the abrasive backing material.

The input screen D4 shown in FIG. 7 is a screen for inputting a type of the abrasive grain of the grinder. Specifically, there is selected one from "A," "WA," "PA," "HA," "AE," "AZ (25)," "AZ (40)," "C," "GC," "D," "SD," "SDC," "CBN," and "CBNC." Due to such an input screen D4, it is possible to input the information related to the type of the abrasive grain of the grinder.

The input screens D5 through D7 shown in FIG. 8 through FIG. 10 are each a screen for inputting an abrasive grain size of the grinder. The input screen D5 shown in FIG. 8 is in a state in which "Grinding Wheel" is selected, the input screen D6 shown in FIG. 9 is in a state in which "Sand Paper" is selected, and the input screen D7 shown in FIG. 10 is in a state in which "Diamond/CBN" is selected.

The input screen D5 shown in FIG. 8 is a screen for inputting the abrasive grain size in "Grinding Wheel." Specifically, there is selected one from "F4," "F5," "F6," "F7," "F8," "F10," "F12," "F14," "F16," "F20," "F22," "F24," "F30," "F36," "F40," and subsequent numerical values. Due to such an input screen D5, it is possible to input the information related to the abrasive grain size in "Grinding Wheel."

The input screen D6 shown in FIG. 9 is a screen for inputting the abrasive grain size in "Sand Paper." Specifically, there is selected one from "P180," "P220," "P240," "P280," "P320," "P360," "P400," "P500," "P600," "P800," "P1000," "P1200," "P1500(S)," "P2000(S)," "P2500(S)," and subsequent numerical values. Due to such an input screen D6, it is possible to input the information related to the abrasive grain size in "Sand Paper."

The input screen D7 shown in FIG. 10 is a screen for inputting the abrasive grain size in "Diamend/CBN." Specifically, there is selected one from "30/40 (#30)," "40/50 (#40)," "50/60 (#50)," "60/80 (#60)," "80/100 (#80)," "100/120 (#100)," "120/140 (#120)," "140/170 (#140)," "170/200 (#170)," "200/230 (#200)," "230/270 (#230)," "270/325 (#270)," "325/400 (#325)," "#500," "#600," and subsequent numerical values. Due to such an input screen D7, it is possible to input the information related to the abrasive grain size in "Diamend/CBN."

The input screen D8 shown in FIG. 11 is a screen for inputting the shape of the polishing area of the work W1. Specifically, there is selected one from "Flat Surface," "Curved Surface," and "Edge." Due to such an input screen D8, it is possible to input the information related to the shape of the polishing area of the work W1.

The input screen D9 shown in FIG. 12 is a screen for inputting the surface roughness obtained after the polishing. Specifically, there is selected one from "Debuming," "Cutter Mark Removal," "Partingline Removal," and "Hairline Finish," and so on. Due to such an input screen D9, it is possible to input the information related to the surface roughness of the work W1.

It is possible to input the task information using such input screen D1 through the input screen D9.

Then, in the input result display screen D10 shown in FIG. 13, there is displayed the task information thus input. Subsequently, when a button on which "Finish" is displayed in the input result display screen D10 is pressed, the readout section 32D selectively reads out the information of the force control parameters suitable for the task information thus obtained, from a database stored in the storage section 3C.

In the storage section 3C, there is stored paired information in which the task information and the information of the force control parameters suitable to that task information associated with each other. The paired information is stored in the storage section 3C for each of the combinations different in category of the task information. The readout section 32D searches for the task information which coincides with, or can be assumed to be the closest to, the task information thus obtained, and then reads out the information of the force control parameters associated with the task information.

Then, the display control section 33D transmits the command signal to the teaching device 4 so as to display the information of the force control parameters read out by the readout section 32D on the display section 41 as, for example, the display screen D11 shown in FIG. 14. Thus, it is possible to display the force control parameters suitable for the polishing task to subsequently be performed on the display section 41. Therefore, it is possible for the operator to set the force control parameters displayed, without change or after performing a fine adjustment thereon.

Here, in the past, in the setup of the force control parameters, there is adopted a method of repeating the task while changing the force control parameters to search for the force control parameters suitable for the polishing task, and therefore, the adjustment is difficult for anyone except persons of experience. In contrast, according to the present disclosure, the task information related to the polishing task is obtained, and the information of the force control parameters corresponding to the task information is selectively read out, and is then displayed. According to such a configuration, it is possible to omit such a cumbersome task as in the related art, and at the same time, it is possible even for an unskilled person to set appropriate force control parameters.

As described above, the force control parameter setup support system 10A according to the present disclosure is provided with the setup support section 3D for supporting the setup of the force control parameters to be used for the force control when controlling the robot arm 10 the tip of which is attached with the polishing tool using the force control to perform the polishing task on the work W1 as the object. The setup support section 3D has the acquisition section 31D for obtaining the task information related to the polishing task, the readout section 32D for selectively reading out the information of the force control parameters corresponding to the task information obtained by the acquisition section 31D, from the storage section 3C in which the plurality of pieces of information of the force control parameters is stored, and the display control section 33D for displaying the information of the force control parameters read out by the readout section 32D on the display section 41. Thus, it is possible to omit such a cumbersome setup task as in the related art, and at the same time, it is possible even for an unskilled person to set the appropriate force control parameters.

Further, the task information includes the information related to the work W1 as the object, and the information related to the polishing tool. Thus, it is possible to read out the force control parameters taking the information related to the work W1 and the information related to the polishing tool into consideration. Therefore, it is possible to set more suitable force control parameters.

Further, the information related to the work W1 as the object includes at least one of the information related to the shape of the polishing area of the work W1, the information related to the dimension of the polishing area of the work W1, the information related to the material of the polishing area, the information related to the surface roughness of the polishing area on which the polishing has not been performed, and the information related to the target surface roughness of the polishing area on which the polishing has been performed. Thus, it is possible to read out the force control parameters taking at least one of these pieces of information into consideration. Therefore, it is possible to set more suitable force control parameters.

Further, the polishing tool has the rotating grinder, and the information related to the polishing tool includes at least one of the information related to the material of the abrasive grain of the grinder, and the information related to the size of the abrasive grain. Thus, it is possible to read out the force control parameters taking at least one of these pieces of information into consideration. Therefore, it is possible to set more suitable force control parameters.

The force control parameter setup support method according to the present disclosure will hereinafter be described using a flowchart shown in FIG. 15.

In the present embodiment, there is adopted a configuration in which the control device executes the following steps, but the present disclosure is not limited to this configuration, and when the setup support section is incorporated in the teaching device, it is possible to adopt a configuration in which the teaching device executes the following steps.

The force control parameter setup support method has a first step S101, a second step S102, and a third step S103.

First, in the first step S101, the task information related to the polishing task is obtained. In the present step, the operator inputs the information from such screens as shown in FIG. 4 through FIG. 12, and the acquisition section 31D obtains the information.

Then, in the second step S102, the information of the force control parameters corresponding to the task information obtained in the step S101 is selectively read out from the storage section 3C which stores the plurality of pieces of information of the force control parameters.

On this occasion, when defining the task information thus obtained as first task information, and the task information stored in the storage section 3C as second task information, the first task information and the second task information are compared with each other, and the information of the force control parameters corresponding to the second task information the highest in degree of coincidence is read out. In the present embodiment, the information of the force control parameters corresponding to the second task information in which the category having a higher priority coincides is read out.

As described above, the task information is classified into categories, and the categories are provided with the priorities in reading out the information of the force control parameters in the second step. Thus, it is possible to set more suitable force control parameters.

It should be noted that this configuration is not a limitation, and it is possible to adopt a configuration in which, for example, the first task information and the second task information are compared in each of the categories with each other, and there is read out the information of the force control parameters corresponding to the second task information the largest in number of categories in which the first task information and the second task information coincide with each other.

Subsequently, in the third step S103, the information of the force control parameters read out in the second step S102 is displayed on the display section 41. In other words, a signal for displaying the information of the force control parameters on the display section 41 is generated, and is then transmitted to the teaching device 4. Thus, it is possible to display the force control parameters suitable for the polishing task to subsequently be performed on the display section 41. Therefore, it is possible for the operator to set the force control parameters displayed, without change or after performing a fine adjustment thereon.

As described above, the force control parameter setup support method according to the present disclosure is a method of supporting the setup of the force control parameters to be used for the force control when controlling the robot arm 10 the tip of which is attached with the polishing tool using the force control to perform the polishing task on the work W1 as the object. Further, the force control parameter setup support method has the first step of obtaining the task information related to the polishing task, the second step of selectively reading out the information of the force control parameters corresponding to the task information obtained in the first step from the storage section 3C in which the plurality of pieces of information of the force control parameters is stored, and the third step of displaying the information of the force control parameters read out in the second step on the display section 41. Thus, it is possible to omit such a cumbersome setup task as in the related art, and at the same time, it is possible even for an unskilled person to set the appropriate force control parameters.

It should be noted that although in the present embodiment, the end effector 20 is formed of the polishing tool for performing polishing, and the robotic system 100 is configured to perform the task on the work W1 as the object, this is not a limitation, and it is possible to adopt a configuration in which the end effector 20 is formed of a gripping section, and the work W1 is gripped by the gripping section, and the task is performed using a polishing tool provided separately from the robot 1. Also in such a case, it is possible to omit such a cumbersome setup task as in the related art, and at the same time, it is possible even for an unskilled person to set the appropriate force control parameters.

Another Configuration Example of Robotic System

Figure 16:
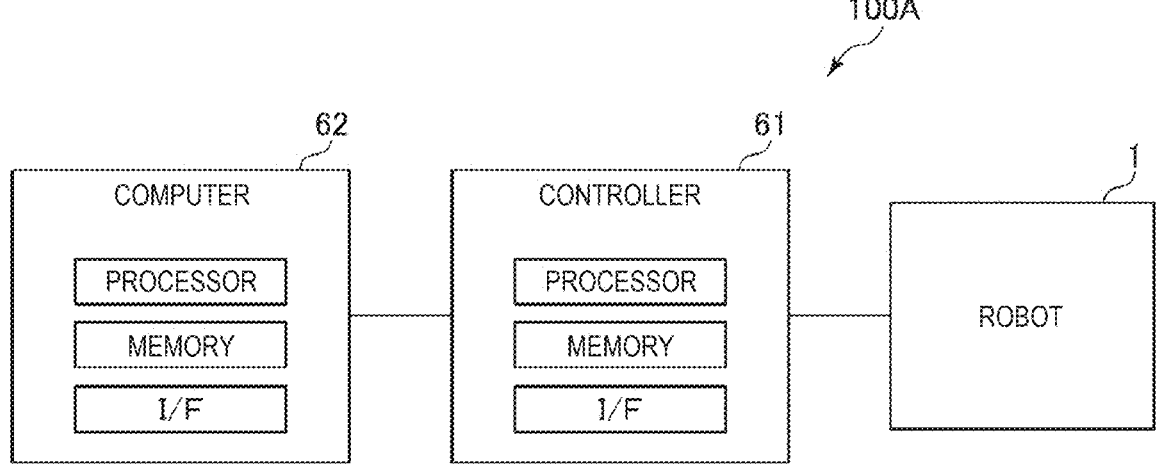
FIG. 16 is a block diagram for explaining a robotic system with a focus on hardware.

FIG. 16 is a block diagram for explaining a robotic system with a focus on hardware.

FIG. 16 shows an overall configuration of the robotic system 100A having the robot 1, a controller 61, and a computer 62 coupled to each other. The control of the robot 1 can be executed by reading out commands located in the memory with a processor located in the controller 61, or can be executed via the controller 61 by reading out the commands located in the memory with a processor located in the computer 62.

Therefore, it is possible to recognize either one or both of the controller 61 and the computer 62 as a "control device."

MODIFIED EXAMPLE 1

Figures 17, 18:
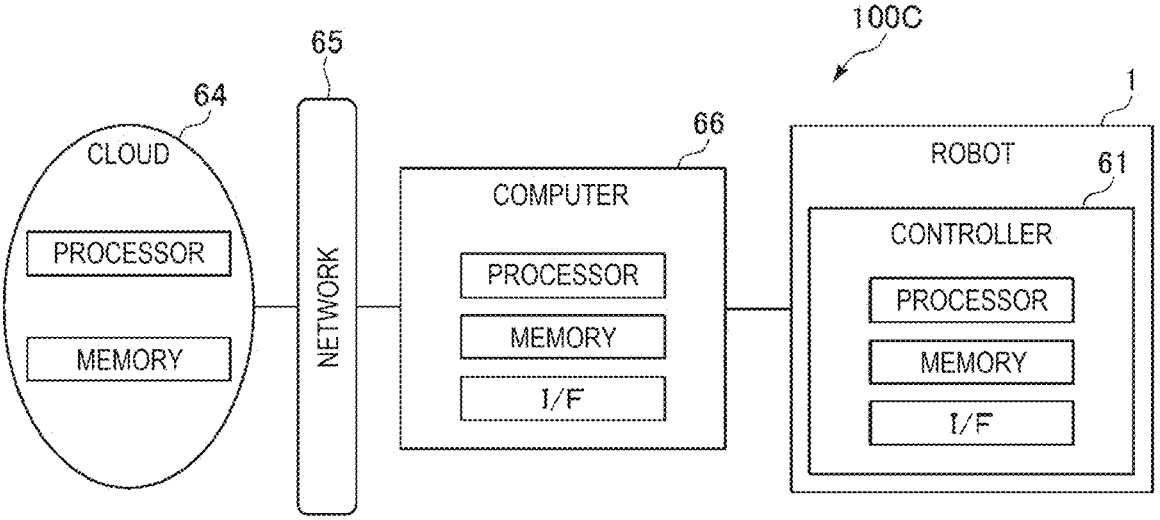
FIG. 17 is a block diagram showing Modified Example 1 with a focus on hardware of a robotic system.
FIG. 18 is a block diagram showing Modified Example 2 with a focus on hardware of a robotic system.

FIG. 17 is a block diagram showing Modified Example 1 with a focus on hardware of a robotic system.

FIG. 17 shows an overall configuration of the robotic system 100B in which a computer 63 is directly coupled to the robot 1. The control of the robot 1 is directly executed by a processor located in the computer 63 reading out the commands located in the memory.

Therefore, it is possible to recognize the computer 63 as the "control device."

MODIFIED EXAMPLE 2

FIG. 18 is a block diagram showing Modified Example 2 with a focus on hardware of a robotic system.

FIG. 18 shows an overall configuration of the robotic system 100C in which the robot 1 incorporating the controller 61 and a computer 66 are coupled to each other, and the computer 66 is connected to the cloud 64 via a network 65 such as LAN. The control of the robot 1 can be executed by reading out the commands located in the memory with a processor located in the computer 66, or can be executed by reading out the commands located in the memory via the computer 66 with a processor located on the cloud 64.

Therefore, it is possible to recognize any one, two, or three of the controller 61, the computer 66, and the cloud 64 as the "control device."

The force control parameter setup support method and the force control parameter setup support system according to the present disclosure are hereinabove described based on the illustrated embodiment, but the present disclosure is not limited thereto. Further, the constituents of the force control parameter setup support system can be replaced with those capable of exerting substantially the same functions, and having arbitrary configurations. Further, it is possible to add arbitrary constituents.

What is claimed is:

1. A force control parameter setup support method for causing a processor to execute a process, the force control parameter setup support method comprising executing on the processor the steps of:

obtaining task information related to a polishing task of a robot from a memory, the robot having a robot arm and performing the polishing task on an object using a polishing tool attached to a tip of the robot arm with force control, the task information including:

object information that is at least one of a shape of a polishing area of the object, a dimension of the polishing area, a material of the polishing area, a non-polishing surface roughness of the polishing area on which the polishing task is not performed, and a target surface roughness of the polishing area on which the polishing task is performed; and polishing tool information that is at least one of a material of an abrasive grain of the polishing tool, a size of the abrasive grain, and a rotational speed of the polishing tool;

selectively reading out parameter information of a plurality of force control parameters for the force control corresponding to the task information, each of the object information and the polishing tool information corresponding to only one force control parameter of the plurality of force control parameters;

displaying the parameter information; and causing the robot to perform the polishing task on the object with the force control based on the parameter information.

2. The force control parameter setup support method according to claim 1, wherein the polishing tool has a rotating grinder, and the material of the abrasive grain of the polishing tool is a material of an abrasive grain of the rotating grinder.

3. The force control parameter setup support method according to claim 1, wherein the task information is classified into categories, and the categories are provided with priorities in reading out the parameter information of the plurality of force control parameters.

4. A force control parameter setup support system comprising:

a memory configured to store a program;

a processor configured to execute the program so as to:

obtain task information related to a polishing task of a robot from a memory, the robot having a robot arm and performing the polishing task on an object using a polishing tool attached to a tip of the robot arm with force control, the task information including:

object information that is at least one of a shape of a polishing area of the object, a dimension of the polishing area, a material of the polishing area, a non-polishing surface roughness of the polishing area on which the polishing task is not performed, and a target surface roughness of the polishing area on which the polishing task is performed; and polishing tool information that is at least one of a material of an abrasive grain of the polishing tool, a size of the abrasive grain, and a rotational speed of the polishing tool;

selectively read out parameter information of a plurality of force control parameters for the force control corresponding to the task information, each of the object information and the polishing tool information corresponding to only one force control parameter of the plurality of force control parameters;

display the parameter information; and cause the robot to perform the polishing task on the object with the force control based on the parameter information.

5. The force control parameter setup support system according to claim 4, wherein the polishing tool has a rotating grinder, and the material of the abrasive grain of the polishing tool is
a material of an abrasive grain of the rotating grinder.

6. The force control parameter setup support system according to claim 4, wherein the task information is classified into categories, and the categories are provided with priorities in reading out
the parameter information of the plurality of force
control parameters.

5

* * * * *